United States Patent
Abad Molina et al.

(10) Patent No.: US 8,605,743 B2
(45) Date of Patent: Dec. 10, 2013

(54) POWER LINE COMMUNICATIONS DEVICE TRANSMITTING AT DIFFERING POWER LEVELS IN SAME COMMUNICATION

(75) Inventors: Jose Abad Molina, Rincon de la Victoria (ES); Jonathan Ephraim David Hurwitz, Edinburgh (GB)

(73) Assignee: Broadcom Corporation, Irvine, CA (US)

( * ) Notice: Subject to any disclaimer, the term of this patent is extended or adjusted under 35 U.S.C. 154(b) by 90 days.

(21) Appl. No.: 13/167,565

(22) Filed: Jun. 23, 2011

(65) Prior Publication Data

US 2011/0317723 A1 Dec. 29, 2011

(30) Foreign Application Priority Data

Jun. 23, 2010 (GB) .................................. 1010539.3

(51) Int. Cl.
*H04L 12/413* (2006.01)
(52) U.S. Cl.
USPC ........................................................ 370/445
(58) Field of Classification Search
USPC .......................................... 370/475, 445, 442
See application file for complete search history.

(56) References Cited

U.S. PATENT DOCUMENTS

| | | | |
|---|---|---|---|
| 6,995,657 B2 * | 2/2006 | Zalitzky et al. ................ 370/445 |
| 8,149,967 B2 * | 4/2012 | Umari et al. ................... 375/345 |
| 2005/0058089 A1 * | 3/2005 | Vijayan et al. ................ 370/312 |
| 2007/0195812 A1 * | 8/2007 | Lee ................................ 370/445 |
| 2009/0303869 A1 * | 12/2009 | Umari et al. ................... 370/210 |
| 2011/0164514 A1 * | 7/2011 | Afkhamie et al. ............. 370/252 |

FOREIGN PATENT DOCUMENTS

| | | |
|---|---|---|
| EP | 1770870 A1 | 4/2007 |
| WO | 0215413 A2 | 2/2002 |
| WO | 2009150224 A1 | 12/2009 |

OTHER PUBLICATIONS

European Search Report: EP11005166.1 dated Oct. 20, 2011, 3 pages.

* cited by examiner

*Primary Examiner* — Mark Rinehart
*Assistant Examiner* — Mohammad Anwar
(74) *Attorney, Agent, or Firm* — Garlick & Markison; Bruce E. Garlick

(57) ABSTRACT

A power-line communications (PLC) device communicates with a second PLC device via a PLC medium and includes a transmitter and a receiver. The transmitter transmits a Request to Send (RTS) communication to the second PLC device at a first power level. The receiver receives a Clear to Send (CTS) communication from the second PLC device. The transmitter transmits data to the second PLC device at a second power level that is less than the first power level. The transmitter transmits a TDM frame to the second PLC device that includes a preamble and header transmitted at a first power level and at least one special data symbol and a payload transmitted at a second power level that is less than the first power level. The special data symbol resides between the preamble or header and the payload and is usable by the second PLC device for processing of the payload.

24 Claims, 2 Drawing Sheets

POWER LINE COMMUNICATIONS DEVICE TRANSMITTING AT DIFFERING POWER LEVELS IN SAME COMMUNICATION

CROSS-REFERENCE TO PRIORITY APPLICATION

This application claims priority under 35 U.S.C. §119(a) to Great Britain Application Serial No. 1010539.3 filed Jun. 23, 2011, which is incorporated herein by reference in its entirety for all purposes.

FIELD OF THE INVENTION

The present invention relates to a communications network, network devices configured to, in use, form such a communications network and a method of communicating digital data in such a communications network.

BACKGROUND TO THE INVENTION

In communications networks, such as multimedia home networks that make use of broadband powerline communication (PLC), it may be advantageous under certain circumstances to change the level of power at which digital data is communicated between and amongst network nodes. The injected power spectral density (PSD) of a signal in a PLC communications channel may be reduced below a nominal or maximum injected PSD for the channel to conserve power or to comply with regulations for conducted or radiated emissions in a particular frequency band. Alternatively, for example, the injected PSD may be reduced in one or more of the highest powered sub-bands of a plurality of sub-bands in a communications channel to effect an overall improvement in the Signal to Noise Ratio (SNR) for the communications channel. Determining when and how to do these things has not heretofore been addressed.

DETAILED DESCRIPTION

Figure 1:
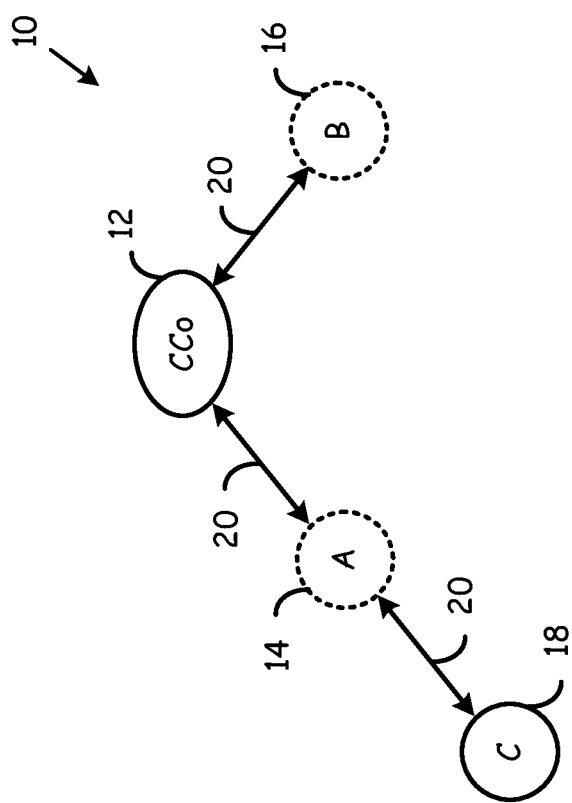
FIG. 1 is a representation of a network of consumer products in a building.

According to a first aspect of the present invention there is provided a communications network including a transmitter and at least two receivers, the transmitter being configured to transmit digital data to the at least two receivers over a communications channel, the transmitter being further configured to transmit the digital data in a frequency band of the communications channel and such that first and second blocks of the digital data are both conveyed in the frequency band at first and second power levels respectively, the first and second power levels being different from each other.

If a transmitter transmits digital data at a power level that is lower than, for example, a normal power level there is an increased risk of the digital data not being recognised by a receiver located far from the transmitter. Data transmitted from a transmitter to a first receiver often includes data, such as control data, that is required to be heard by at least a second receiver in a network as well as the first receiver. For example, the transmitter may transmit a frame including payload data intended for the first receiver alone and a preamble, which contains data required to maintain synchronization within the network, that is intended for reception by both the first and second receivers.

The present inventors have recognised that reducing the power level for data transmitted to a nearer receiver increases the risk of data that is intended for both receivers not being heard by the receiver that is farther away from the transmitter. Therefore and according to the present invention, the transmitter is configured to transmit digital data in a frequency band of the communications channel such that first and second blocks of the digital data are both conveyed in the frequency band at first and second power levels respectively, the first and second power levels being different from each other. Hence, for example, the second block may be at a lower power level and therefore intended for reception by a nearer one of the first and second receivers and the first block may be at a higher power level and therefore intended for reception by both of the first and second receivers. Power level may be determined on the basis of injected Power Spectral Density (PSD).

More specifically, the first block of data may contain supplemental data, such as control or configuration data, the second block of data may consist of payload data and the second power level may be lower than the first power level. The supplemental data may be supplementary to the payload data. For example, the supplemental data may include data used for control or configuration purposes with such control or configuration data depending on the form of communications protocol used.

Alternatively or in addition, the second power level may be at least substantially 2 dB lower than the first power level. More specifically, second power level may be at least substantially 10 dB lower than the first power level. More specifically, the second power level may be at least substantially 20 dB lower than the first power level. Alternatively or in addition, the second power level may be between substantially 10 dB and substantially 30 dB lower than the first power level.

Alternatively or in addition, the first power level may be substantially at a maximum power level that can be allowed by regulation in the frequency band.

Alternatively or in addition, the transmitter may be configured to transmit data in a plurality of frequency bands defined in the communications channel. Thus, communication between the transmitter and the receivers may be on the basis of frequency-division multiplexing (FDM). Operation of the transmitter may be such that the first and second blocks of digital data are transmitted over one of the frequency bands at the first and second power levels respectively. The transmitter may be further configured such that first and second blocks of data are both transmitted at different power levels over each of the plurality of frequency bands. Where the transmitter is configured to transmit data over frequency sub-bands, the transmitter may be operative to transmit both first and second blocks of data at different power levels over each of at least one frequency band or frequency sub-band. Where the first and second blocks of data are transmitted over frequency sub-bands, the frequency sub-bands may be spaced apart from each other in the frequency domain, e.g. with a first sub-band being between 2 and 20 MHz and a second sub-band being between 40 and 80 MHz. Alternatively, the frequency sub-bands may be substantially adjacent in the frequency domain, e.g. with a first sub-band being between 2 and 30 MHz and a second sub-band being between 30 and 80 MHz.

In a first form, the first and second blocks of data may form part of a data frame. Hence, the first block of data may be supplemental data in at least one of a preamble and a header of the data frame and the second block of data may consist of a payload of the data frame.

Hence and where access to the communications channel is by means of a Time Division Multiple Access (TDMA) approach or a Carrier Sense Multiple Access (CSMA) approach, the data frame may include a preamble, a header and payload, with the preamble and header being transmitted at a higher level of power and the payload being transmitted at a lower level of power. The preamble may include data for at least one of synchronization, automatic gain control (AGC) adjustment and channel estimation purposes. The header may include data for at least one of control, frame information and channel estimation purposes.

More specifically, the data frame may include at least one special data symbol between the preamble or header and the payload, the at least one special data symbol being transmitted at the same power level as the payload. The first receiver may be operative to at least one of adjust an AGC device and estimate the channel response in dependence on the received at least one special data symbol. Hence, the at least one special data symbol provides for proper AGC and channel estimation adjustment in view of the change in power level and sometimes a change in phase level between the preamble or header and the payload.

In a second form, the first and second blocks of data may form part of separate, i.e. spaced apart, data packets. This approach may be advantageous when a frame format cannot be changed or when there is a limit to the extent to which a format of a frame can be changed.

Hence and where access to the communications channel is by means of a Time Division Multiple Access (TDMA) approach, the first block of data may be transmitted at a higher level of power to the first and second receivers and then the second block of data may be transmitted at a lower level of power for reception by the first receiver. The first block of data may include data of interest to both the first and second receivers, such as data specifying when the second block of data is to be transmitted and to which receiver, and the duration of the second block of data.

Where access to the communications channel is by means of a Carrier Sense Multiple Access (CSMA) approach, the transmitter may be configured to transmit the first block of data in the form of a Request to Send (RTS) and the intended receiver may be configured to transmit Clear to Send (CTS) data in response, with the RTS and CTS data being transmitted at the higher power level. Then the transmitter may be operative to send the second data block in the form of payload data at the lower power level. The RTS data may contain data required by both of the first and second receivers, such as data representing the sum of the durations of the RTS data, the CTS data and the payload data. The CTS data may, for example, contain data representing the sum of the durations of the CTS data and the payload data.

Where access to the communications channel is by means of a Carrier Sense Multiple Access (CSMA) approach, the transmitter may be configured to transmit the first block of data in the form of a first packet, which contains at least one of preamble and header data, at a higher power level and to transmit the second block of data in the form a second packet, which contains payload data, at a lower power level. In contrast to the approach defined in the immediately preceding paragraph, no CTS data may be sent in response to the first packet. Compared to the approach defined in the immediately preceding paragraph, the present approach has the advantage that there is no need to change the format of data frames but the disadvantage that there is an increase in data overhead.

According to a second aspect of the present invention, there is provided network of consumer products including a communications network according to the first aspect of the present invention.

The consumer products may include at least one multimedia device. Thus, the network of consumer products may be a multimedia home communications network.

Further embodiments of the second aspect of the present invention may include one or more features of the first aspect of the present invention.

According to a third aspect of the present invention, there is provided network devices including a transmitter and at least two receivers, which are configured to, in use, form a communications network, the transmitter being configured to, in use, transmit digital data to the at least two receivers over a communications channel, the transmitter being further configured to transmit, in use, the digital data in a frequency band of the communications channel and such that first and second blocks of the digital data are both transmitted in the frequency band at first and second power levels respectively, the first and second power levels being different from each other.

Embodiments of the third aspect of the present invention may include one or more features of the first aspect of the present invention.

According to a fourth aspect of the present invention, there is provided a method of communicating digital data in a communications network including a transmitter and at least two receivers, the method including:

operating the transmitter to transmit digital data to the at least two receivers over a communications channel, the transmitter being configured to transmit the digital data in a frequency band of the communications channel and such that first and second blocks of the digital data are both transmitted in the frequency band at first and second power levels respectively, the first and second power levels being different from each other.

Embodiments of the fourth aspect of the present invention may include one or more features of the first aspect of the present invention.

FIG. 1 shows a network 10 of consumer products in a building. The network includes first 12, second 14, third 16 and fourth 18 nodes. Adjacent pairs of nodes are connected to each other by a communications medium 20, for example an already installed communications medium, such as mains power wiring, or air where communication is wireless, which provides for communication between and amongst a plurality of rooms in the residential building. Thus, for example, each of the first to fourth nodes may be located in a different room of the residential building. Each of the first to fourth nodes includes a different multi-media device (which constitutes a consumer product). Thus, for example, the first node 12 includes a Home Gateway (HGW), the second node 14 includes Personal Computer (PC), the third node 16 includes audio-visual entertainment devices and the fourth node 18 includes Network Attached Storage (NAS).

In the network 10 of FIG. 1 the first node 12 is configured to operate as a communications controller, the second 14 and third 16 nodes are configured to operate as repeater nodes and the fourth node 18 is configured to operate as a standard network node. A communications controller controls the channel access or use schedule of the network to which it belongs. Normally there is only one communications controller in a network. A standard node provides for communication of data from the branch of the communications medium leading to the node to the branch of communications medium leading from the node and for communication with the multimedia device connected to the node.

A repeater node provides for communication of data from the branch of the communications medium leading to the node to the branch of communications medium leading from the node but provides for no communication with the multimedia device connected to the node, e.g. where the multimedia device is not being used. Referring to FIG. 1, the configuration of the nodes might be such that the HGW connected to the first node is streaming a film from an external source to the network and the NAS connected to the fourth node 18 might be saving the film. Network node devices are present at each of the first to fourth nodes 12, 14, 16, 18 of FIG. 1.

The network node device at each node in FIG. 1 includes a home networking integrated circuit provided within an appropriate enclosure. Network node devices are operative to provide for communication with a consumer product by way of an Ethernet interface and with the other nodes in the network over at least one of mains power wiring, co-axial cable and phone line. Hence, a home networking integrated circuit at each node includes a transmitter and a receiver that provide for communication with transmitters and receivers of home networking integrated circuits at the other nodes.

Figure 2:
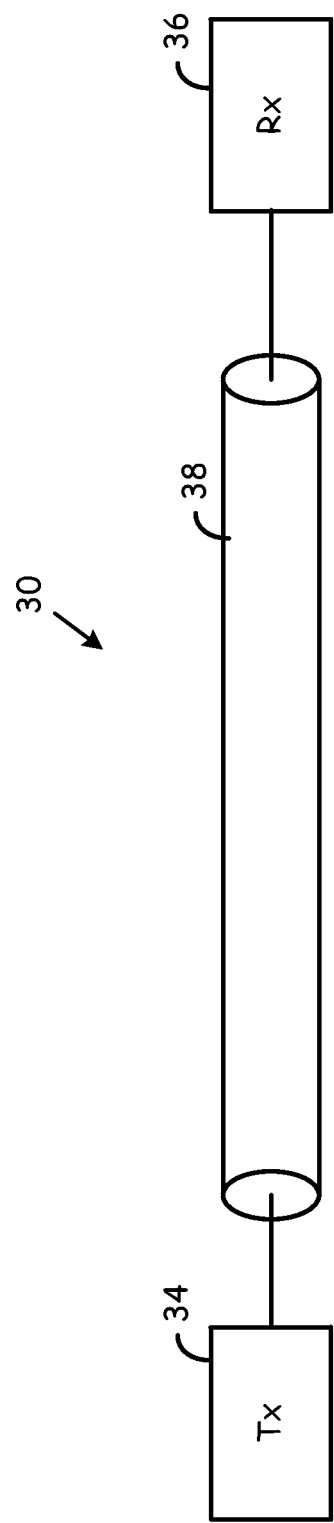
FIG. 2 is a representation of a communications link between two nodes.

Referring to FIG. 2, a communication link between a first home network integrated circuit and a second home network integrated circuit includes a transmitter 34 at the first home network integrated circuit and a receiver 36 at the second home network integrated circuit. The transmitter 34 and the receiver communicate digital data through a communications channel 38 defined in, for example, mains power wiring. Traditional thinking (based on Shannon's law) teaches that signals should be transmitted at maximum power to maximize throughput. However, this approach increases the noise from the transmitter in real implementations. As discussed in detail in WO 2009/150224 (to the present inventors), a counter-intuitive approach is taken in a configuration in which digital data is communicated from transmitter 34 to receiver 36 by means of Time Division Multiple Access (TDMA). Thus digital data is communicated from the transmitter to the receiver in a plurality of frequency sub-bands. The frequency sub-bands are adjacent in the frequency domain, e.g. a first sub-band is between 2 and 30 MHz and a second sub-band is between 30 and 80 MHz. According to the counter-intuitive approach of WO 2009/150224 the power level injected in the one or more highest powered sub-bands is reduced. This improves the total SNR of the overall communication system (when the quality of the channel allows this improvement). In particular, reducing the maximum power spectral density of a band causes quantization noise to be reduced in approximately the same quantity. Similarly, reducing the maximum power spectral density of a band causes analog distortion to be reduced by a factor greater or equal to the reduction in PSD.

Under certain circumstances, the approach of WO 2009/150224 can be disadvantageous. Referring to FIG. 1, if the fourth node 18 were to transmit data to the second node 14 with the data being transmitted at a power level that is reduced whilst being of a sufficient level that the data is received by the second node there is an increased risk of the transmitted data not being received by more distant nodes, such as the first and third nodes 12, 16. Whilst the increased risk of data not being received by the first and third nodes 12, 16 is no disadvantage where payload data is intended solely for the second node, proper functioning of the network requires reception by all nodes of data other than payload data. Hence and according to the present invention, payload data is transmitted in a particular band or sub-band at a reduced power level and data other than payload data is transmitted in the same band or sub-band at a maximum or nominal power level. Typically, the Power Spectral Density (PSD) of the lower power signal is 20 to 30 dB below the PSD of the maximum or nominal power level signal. The particular approach taken to power level variation in a band or sub-band depends on the communications protocol in use, as will become apparent from the following examples.

According to a first example, communication from the transmitter 34 and the receiver 36 of FIG. 2 is by means of Time Division Multiple Access (TDMA) such that digital data is conveyed in a plurality of data frames. Each data frame includes a preamble, a header and a payload, with the preamble and header being transmitted at a maximum or nominal level of power and the payload being transmitted at the lower level of power. The preamble includes data for synchronization, automatic gain control (AGC) adjustment and channel estimation purposes. The header includes data for control, frame information and channel estimation purposes. Each data frame has a special data symbol between the header and the payload, with the special data symbol being transmitted at the same power level as the payload. The special data symbol enables the receiver to adjust its Automatic Gain Control (AGC) circuit and channel estimation information to accommodate the change in received signal strength from header to payload.

According to a second example, communication from the transmitter 34 and the receiver 36 of FIG. 2 is by means of a Carrier Sense Multiple Access (CSMA) approach such that digital data is conveyed in a plurality of data frames. As with the first example, each data frame includes a preamble, a header and a payload, with the preamble and header being transmitted at a maximum or nominal level of power and the payload being transmitted at the lower level of power. The preamble includes data for synchronization, automatic gain control (AGC) adjustment and channel estimation purposes. The header includes data for control, frame information and channel estimation purposes. Each data frame has a special data symbol between the header and the payload, with the special data symbol being transmitted at the same power level as the payload. The special data symbol enables the receiver to adjust its Automatic Gain Control (AGC) circuit and channel estimation information to accommodate the change in received signal strength from header to payload.

According to a third example, communication from the transmitter 34 and the receiver 36 of FIG. 2 is by means of Time Division Multiple Access (TDMA) such that payload data and control data are conveyed in spaced apart data packets. A first data packet containing control data is transmitted at the maximum or nominal power level and then the second data packet containing payload data is transmitted at the reduced power level. The control data includes data of interest to all receivers, such as data specifying when the payload data is to be transmitted and to which receiver, and the duration of the payload data.

According to a fourth example, communication from the transmitter 34 and the receiver 36 of FIG. 2 is by means of a Carrier Sense Multiple Access (CSMA) approach. In this example, the transmitter transmits control data in the form of a Request to Send (RTS) and the receiver transmits Clear to Send (CTS) data in response, with the RTS and CTS data being transmitted at the maximum or nominal power level. Then the transmitter transmits payload data at the reduced power level. The RTS data includes data required by all receivers, such as data representing the sum of the durations of the RTS data, the CTS data and the payload data. The CTS data contains data representing the sum of the durations of the CTS data and the payload data.

According to a fifth example, communication from the transmitter 34 and the receiver 36 of FIG. 2 is by means of a Carrier Sense Multiple Access (CSMA) approach. In this example, the transmitter transmits the control data in the form of a first packet, which contains preamble and header data, at the maximum or nominal power level. The transmitter also transmits the payload data in the form of a second separate packet at the reduced power level. In contrast to the fourth example no CTS data is sent in response to the first packet. Hence, this approach involves separating the preamble and header from the payload data.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may include general or specific purpose hardware, or may include such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A power-line communications (PLC) device operable to communicate with a second PLC device via a PLC medium, the PLC device comprising:
   a transmitter; and
   a receiver,
   the transmitter configured to transmit a Request to Send (RTS) communication to the second PLC device at a first power level;
   the receiver operable to receive a Clear to Send (CTS) communication from the second PLC device; and
   the transmitter configured to transmit data to the second PLC device at a second power level that is less than the first power level; wherein:
   the transmitter determines to send payload data to the second PLC device;
   the transmitter transmits the RTS communication at the first power level wherein the first power level is sufficient to be received by the second PLS device and a more distant third PLC device;
   upon the PLC device receiving the CTS communication from the second PLC device, the transmitter transmits the payload data at the second power level wherein the second power level is one that is required to reach the second PLC device but not the third PLC device.

2. The PLC device of claim 1, wherein the first power level is substantially at a maximum power allowed by regulation in a respective frequency band.

3. The PLC device of claim 1, wherein the transmitter is further operable to:
concurrently transmit:
first data to the second PLC device in a first frequency band; and
second data to the second PLC device in a second frequency band that differs from the first frequency band,
the first data transmitted at a third power level and the second data transmitted at a fourth power level that it less than the third power level.

4. The PLC device of claim 3, wherein the first data comprises supplemental data, such as control or configuration data, the second data comprises payload data.

5. The PLC device of claim 3, wherein:
the transmitter is configured to transmit the first and second data in an Orthogonal Frequency Division Multiplexed (OFDM) format; and
the first frequency band is between 2 and 30 MHz and the second frequency band is between 30 and 80 MHz.

6. The PLC device of claim 3, wherein the third power level is substantially at a maximum power allowed by regulation in a respective frequency band.

7. A method for operating a power-line communications (PLC) device comprising:
transmitting a Request to Send (RTS) communication to a second and to a third PLC device via a PLC medium at a first power level for a communication intended for the second PLC device;
receiving a Clear to Send (CTS) communication from the second PLC device; and
transmitting data to the second PLC device at a second power level that is less than the first power level wherein the second power level is selected to deliver the data to the second PLC device successfully but not to the third PLC device.

8. The method of claim 7, wherein the first power level is substantially at a maximum power allowed by regulation in a respective frequency band.

9. The method of claim 7, further comprising concurrently transmitting:
first data to the second PLC device in a first frequency band at a third power level; and
second data to the second PLC device in a second frequency band that differs from the first frequency band at a fourth power level that it less than the third power level.

10. The method of claim 9, wherein the first data comprises supplemental data, such as control or configuration data, the second data comprises payload data.

11. The method of claim 9, wherein:
the transmitter is operable to transmit the first and second data in an Orthogonal Frequency Division Multiplexed (OFDM) format; and
the first frequency band is between 2 and 30 MHz and the second frequency band is between 30 and 80 MHz.

12. The method of claim 9, wherein the third power level is substantially at a maximum power allowed by regulation in a respective frequency band.

13. A power-line communications (PLC) device operable to communicate with a second and a third PLC device via a PLC medium, the PLC device comprising:
a transmitter; and
a receiver,
the transmitter configured to transmit a time divided data frame to the second PLC device, by:
transmitting a preamble and a header at a first power level to the second and third PLC devices, the preamble comprising data for at least one of synchronization, automatic gain control (AGC) adjustment, and channel estimation purposes, and the header comprising data for at least one of control, frame information and channel estimation purposes;
transmitting a payload at a second power level that is less than the first power level to the second PLC device wherein the second power level is one that is selected for the payload to successfully reach the second PLC device but not the third PLC device; and
transmitting at least one special data symbol between the preamble or header and the payload, the at least one special data symbol being transmitted at the second power level and usable by the second PLC device for processing of the payload.

14. The PLC communications device of claim 13, wherein the at least one special data symbol is usable by the second PLC device for at least AGC adjustment of the payload.

15. The PLC communications device of claim 13, wherein the at least one special data symbol is usable by the second PLC device for at least channel estimation for the payload.

16. The PLC communications device of claim 13, wherein the at least one special data symbol has a constellation known to the second PLC device.

17. The PLC communications device of claim 13, wherein:
the time divided data frame is transmitted in an Orthogonal Frequency Division Multiplexed (OFDM) format;
payloads of a first plurality of OFDM carriers are transmitted at the first power level; and
payloads of a second plurality of OFDM carriers are transmitted at the second power level.

18. The PLC communications device of claim 17, wherein:
the first plurality of OFDM carriers are in a first frequency band between 2 and 30 MHz; and
the second plurality of OFDM carriers are in a second frequency band between 30 and 80 MHz.

19. A method for operating a power-line communications (PLC) device comprising transmitting a time divided data frame to the second PLC device by:
transmitting a preamble and header at a first power level intended to successfully reach second and third PLC devices, the preamble comprising data for at least one of synchronization, automatic gain control (AGC) adjustment, and channel estimation purposes, and the header comprising data for at least one of control, frame information and channel estimation purposes;
transmitting a payload at a second power level that is less than the first power level wherein the second power level is a power level required for the payload to reach the second PLC device but not the third PLC device; and
transmitting at least one special data symbol between the preamble or header and the payload, the at least one special data symbol being transmitted at the second power level and usable by the second PLC device for processing of the payload.

20. The method of claim 19, wherein the at least one special data symbol is usable by the second PLC device for at least AGC adjustment of the payload.

21. The method of claim 19, wherein the at least one special data symbol is usable by the second PLC device for at least channel estimation for the payload.

22. The method of claim 19, wherein the at least one special data symbol has a constellation known to the second PLC device.

23. The method of claim 19, wherein:
the time divided data frame is transmitted in an Orthogonal Frequency Division Multiplexed (OFDM) format;

payloads of a first plurality of OFDM carriers are transmitted at the first power level; and
payloads of a second plurality of OFDM carriers are transmitted at the second power level.

24. The method of claim 23, wherein:
the first plurality of OFDM carriers are in a first frequency band between 2 and 30 MHz; and
the second plurality of OFDM carriers are in a second frequency band between 30 and 80 MHz.

\* \* \* \* \*

UNITED STATES PATENT AND TRADEMARK OFFICE
CERTIFICATE OF CORRECTION

PATENT NO. : 8,605,743 B2  
APPLICATION NO. : 13/167565  
DATED : December 10, 2013  
INVENTOR(S) : Jose Abad Molina et al.

Page 1 of 1

It is certified that error appears in the above-identified patent and that said Letters Patent is hereby corrected as shown below:

In the Claims

Column 9, Line 10, Claim 3: after "power level that" replace "it less" with --is less--
Column 9, Line 46, Claim 9: after "power level that" replace "it less" with --is less--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*